(No Model.) 2 Sheets—Sheet 1.

R. H. BOTTS.
Washing Machine.

No. 234,848. Patented Nov. 30, 1880.

Witnesses:

Inventor:
Robt. H. Botts.
per atty,
A. N. Evans & Co.

(No Model.) 2 Sheets—Sheet 2.

R. H. BOTTS.
Washing Machine.

No. 234,848. Patented Nov. 30, 1880.

Witnesses:
J. Walter Fowler,
W. H. Morsell

Inventor:
Robt. H. Botts.
per attys.
A. H. Evans & Co.

UNITED STATES PATENT OFFICE.

ROBERT H. BOTTS, OF COLOMA, MISSOURI.

WASHING-MACHINE.

SPECIFICATION forming part of Letters Patent No. 234,848, dated November 30, 1880.

Application filed August 27, 1880. (No model.)

*To all whom it may concern:*

Be it known that I, ROBERT H. BOTTS, of Coloma, Carroll county, Missouri, have invented certain new and useful Improvements in Washing-Machines; and I hereby declare the following to be a full, clear, and exact description thereof, reference being had to the accompanying drawings, making part of this specification, in which—

Figure 1:
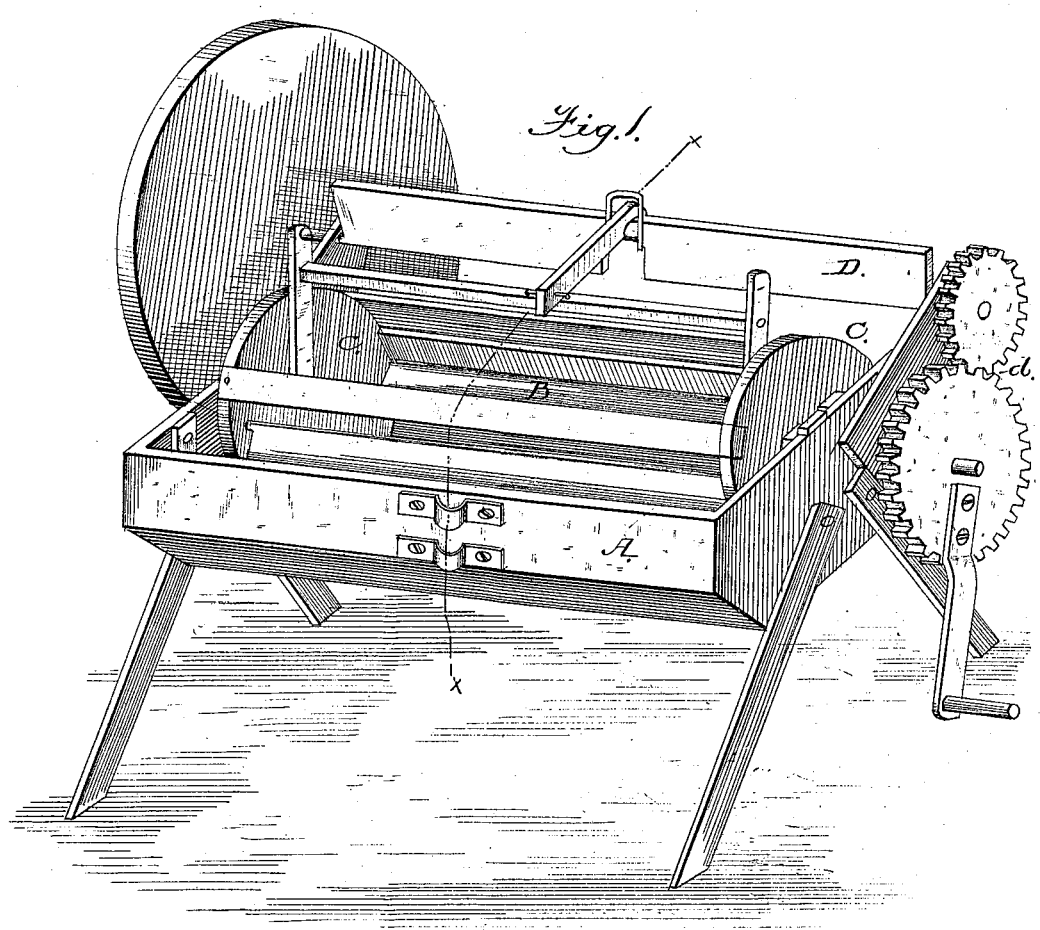
Figure 5:
Figure 2:
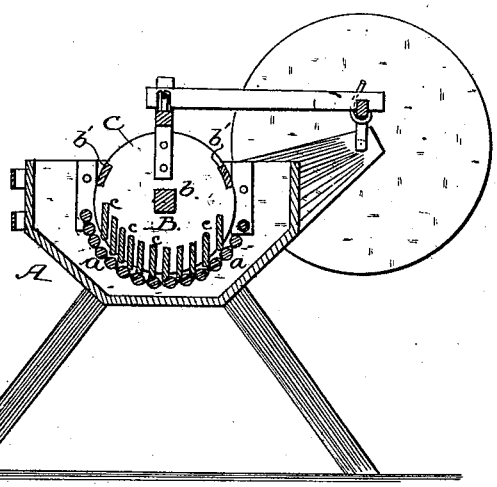
Figure 3:
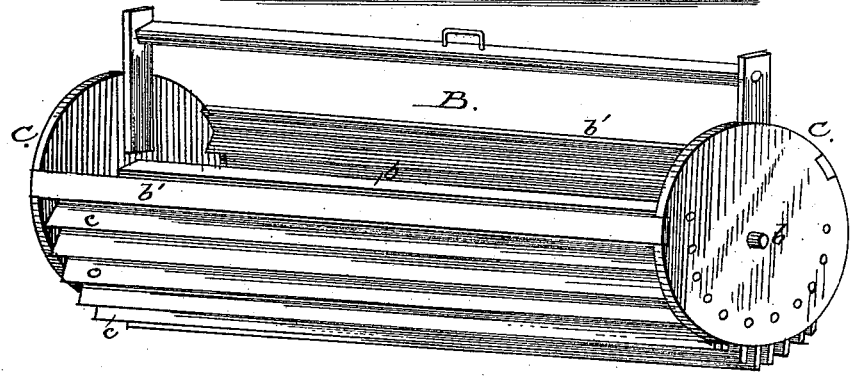
Figure 4:
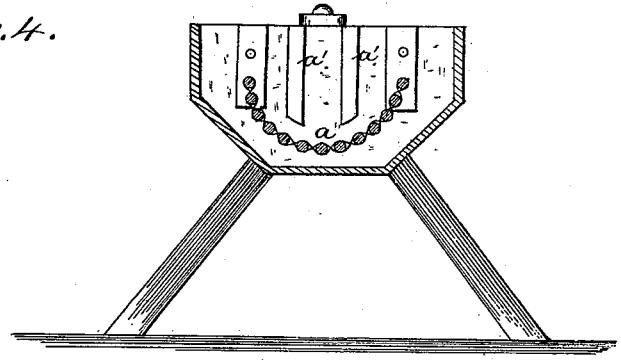

Figure 1 is a perspective view of a washing-machine with my improvements attached. Fig. 2 is a cross-section through the line $x\ x$ of Fig. 1. Fig. 3 is a perspective view of the rubber removed from the washing-vessel. Fig. 4 is a cross-section of vessel with the rubber removed. Fig. 5 is a view of a rubber-slat detached.

My invention relates to a machine for washing clothes by a process of rubbing; and it consists in the combination of devices hereinafter explained and claimed.

To enable others skilled in the art to make and use my invention, I will proceed to describe the exact manner in which I have carried it out.

In the drawings, A represents the tank or vessel in which the clothes are to be placed for washing, and B is an oscillating rubber. In the bottom of the vessel is secured the stationary curved and corrugated rubber-board $a$, and at each end of the vessel are secured the vertical slats $a'\ a'$, between which the ends of the axle $b$ of the rubber rest, and these slats are sufficiently far apart to allow the rubber to oscillate, as hereinafter explained.

The rubber B is formed of two circular disks, C, secured near the opposite ends of the axle $b$, and framed together by means of the two rigid slats $b'\ b'$. Around the lower portion of the disks I form perforations, into which are fitted the necks of the loosely-swinging horizontal slats $c\ c$. These slats hang with their swinging edges on the corrugated rubber-board $a$, and are made to change position as the rubber B is oscillated from side to side, the rubber necessarily rising as it changes direction and rides over the slats, which then change their incline. This constant changing of the incline of the slats $c\ c$ and the downward thrust which they necessarily receive as the frame of the rubber rides over them to change direction, is the essential feature of my invention, as it is this constant thrusting and changing position that tends to loosen up the dirt and speedily remove it from the clothes being washed.

Across the top of the rubber is the longitudinal bar, to which is attached an arm, worked by the crank-shaft D, operated by the gear-wheels $d$ or by any other well-known means.

Having thus described my invention, I claim as new and desire to secure by Letters Patent—

The vessel A, provided with the fixed corrugated rubber-board $a$, in combination with the oscillating rubber B, provided with the loosely-swinging slats $c\ c$, substantially as and for the purpose set forth.

ROBERT HENRY BOTTS.

Attest:
JOHN PARSLEY,
GEO. W. BOYLES.